United States Patent [19]

Horie

[11] Patent Number: 5,142,524
[45] Date of Patent: Aug. 25, 1992

[54] OPTICAL RECORDING MEDIUM

[75] Inventor: Kiyoshi Horie, Yokohama, Japan

[73] Assignee: Kabushiki Kaisha CSK, Tokyo, Japan

[21] Appl. No.: 329,784

[22] PCT Filed: Jul. 6, 1988

[86] PCT No.: PCT/JP88/00678
§ 371 Date: May 3, 1989
§ 102(e) Date: May 3, 1989

[87] PCT Pub. No.: WO89/00329
PCT Pub. Date: Jan. 12, 1989

[30] Foreign Application Priority Data

Jul. 6, 1987 [JP] Japan .................................. 168014

[51] Int. Cl.⁵ .......................... G11B 3/70; G11B 5/84; G11B 7/00
[52] U.S. Cl. ............................. 369/275.1; 369/275.3; 369/275.4; 369/109
[58] Field of Search ............... 369/275.1, 275.3, 275.4, 369/44.13, 44.26, 47, 109; 235/454, 487

[56] References Cited

U.S. PATENT DOCUMENTS

| 4,598,393 | 7/1986 | Pierce et al. | 369/109 X |
| 4,761,775 | 8/1988 | Murakami | 369/275.3 X |
| 4,817,067 | 3/1989 | Takahashi et al. | 369/44.26 X |

FOREIGN PATENT DOCUMENTS

| 0151792 | 7/1986 | Japan | 369/44.26 |
| 0227232 | 10/1986 | Japan | 369/275.3 |
| 0293771 | 11/1988 | Japan | 369/275.1 |

Primary Examiner—John W. Shepperd
Assistant Examiner—Tan Nguyen
Attorney, Agent, or Firm—Lackenbach Siegel, Marzullo & Aronson

[57] ABSTRACT

An optical recording medium having at least one data track and at least one clock track including clock bits provided in a predetermined optical pattern, in which the clock track comprises regular, periodical clock bits arranged regularly in a line and at least one irregular clock bit disposed in the line, breaking the regularity of the periodical clock bits. When a PLL circuit is reinstated into a locked state after it has been unlocked, a leading word can be identified by the irregular clock bit provided in the clock track. This enables data reading thereafter to be accurate.

3 Claims, 3 Drawing Sheets

OPTICAL RECORDING MEDIUM

FIELD OF THE INVENTION

This invention relates to an optical recording medium having at least one clock track provided along a data track or tracks, in which the clock track has a predetermined optical pattern of clock bits formed thereon.

BACKGROUND ART

Recently, an optical recording medium, which has a data recording surface having optically changed patterns, such as light and dark pits, formed thereon to represent digital data, has been attracting public attention. The optical recording medium could realize a memory of a large capacity because of its high density data recording capability. Thus, there has been contemplated, as an optical memory, not only a disc type memory but also a card type memory.

In the card type optical memory or optical memory card, recording is made by forming optical (or magnetooptical) changes in response to data to be recorded at discrete spots on the surface thereof, and then a light beam, such as a laser beam, is projected thereonto to read the changes.

More specifically, fine unevenness or light and dark patterns are provided on a surface of a recording medium or card. A light beam is projected onto such optical patterns to read the recorded data according to a difference in reflectivities, refractive indexes, or transmissivities between the optically changed states of the medium. Alternatively, the recording medium may have photothermo-magnetical record thereon and the recorded data may be read depending upon a change of polarization of the projected light due to the magnetooptical effect.

In juxtaposition with each of the data tracks of the optical memory card, there are provided a clock track for synchronization in a data write/read operation and a tracking guide line as a reference for letting the optical beam from an optical reading system follow the track accurately.

The write/read timing for the optical recording medium is conventionally determined by a clock signal derived by a detector dedicated for detecting clock bits of the clock track.

Incidentally, if the clock is not accurately read in reading the clock track of the optical recording medium by reason of dust, scratch or the like on the optical recording medium or fluctuations of the moving velocity of the recording medium relative to the optical reading system, then it will be difficult to achieve accurate write/read operation. An absence of the clock during a short term or in relatively slow fluctuations of the velocity can be coped with by using a phase locked loop (PLL) circuit which produces a clock of a frequency synchronized with the input of the read out clock.

FIG. 5 illustrates a typical arrangement of a prior art PLL circuit. The PLL circuit 66 comprises a phase comparator 52, a low pass filter (LPF) 54, an amplifier 56, a voltage controlled oscillator (VCO) 58 and a 1/N frequency divider 53. This circuit compares, in phase, a received input signal with an output of the divider 53 so as to match the phase through control of the VCO 58, thus producing, at the output thereof, a clock of a frequency of N times of that of the input signal. When N is 1, a VCO output fonformed with the frequency of the input signal will appear at the output terminal of the PLL circuit 66.

However, for a long-term absence of the clock or for an abrupt change of the relative moving velocity of the medium, the PLL circuit could not ensure the accurate data reading and it may fall into an out-of-locked state. In this case, the following problems may occur. When one data is formed of a plurality of words (a "word" used here means one bit or a plurality of bits to be read by one clock), if the PLL circuit gets unlocked or gets into an out-of-locked state, some words will not be read normally. In this state, if the PLL circuit is reinstated into the locked position again, it can in no way be identified which word in the data is being read.

SUMMARY OF THE INVENTION

The present invention has been made to overcome the problems involved in the prior arts and it is an object of the present invention to provide an optical recording medium which is capable of identifying a first word for a succeeding data when the PLL circuit is reinstated into the locked position after the PLL circuit has fallen into the out-of-locked position and some recorded words have failed to be read normally.

The present invention features an optical recording medium having at least one clock track and at least one data track as illustrated in FIG. 1, in which said clock track comprises clock bits arranged periodically and regularly in a line and at least one irregular clock bit disposed in the line, breaking the regularity of the periodical arrangement of the clock bits.

The irregular clock bit is provided by forming an optically changed state same as those of the clock bits at a space between the adjacent two clock bits.

The irregular clock bit is provided for a leading word of a data on the data track.

According to the present invention, the irregular clock bit is disposed in the line wherein the clock bits are arranged regularly, which enables information for the leading word of the data to be read from the optical recording medium without lowering the data recording density.

A clock reading circuit for the optical recording medium according to the present invention preferably comprises, as illustrated in FIG. 2, a phase locked loop (PLL) circuit which receives a read clock obtained when the clock track is read and an irregular clock detection means which compares a clock output of the PLL circuit with the read signal and generates a detection pulse when the irregular clock bit which breaks the regularity of the clock bits is detected.

With this arrangement, when the PLL circuit is reinstated into the locked position after the PLL circuit for the clocks has fallen into the out-of-locked position and the recorded word or words are not read normally, a first word for one data after the restoration of the PLL circuit into the locked position can be identified.

The present invention is preferably employed for a system in which the out-of-locked state of the PLL circuit is detected to determine that the clock for data reading is not normal when the out-of-locked state is detected and inhibit address updating for a storage means which stores the read data, while allowing only normal data to be stored.

As described above, when the PLL circuit is reinstated into the locked position after the PLL circuit has fallen into the out-of-locked position, a leading word can be identified by the irregular clock bit provided in the clock track. Therefore, the read data thereafter can be recognized accurately. This can be attained without lowering the recording capacity of the optical recording medium.

BEST MODE FOR CARRYING OUT THE INVENTION

Preferred embodiments of the present invention will now be described, referring to the attached drawings.

Optical Recording Medium

In an embodiment as illustrated, an optical memory card is contemplated as an example of an optical recording medium. However, the embodiment may also be applicable to another type of the optical recording medium. The optical memory card as illustrated is so formed that a plurality of data tracks are read simultaneously by each of clock bits. However, the present embodiment may also be applicable to the optical memory card in which only one data track is read by one clock bit.

Figure 1:
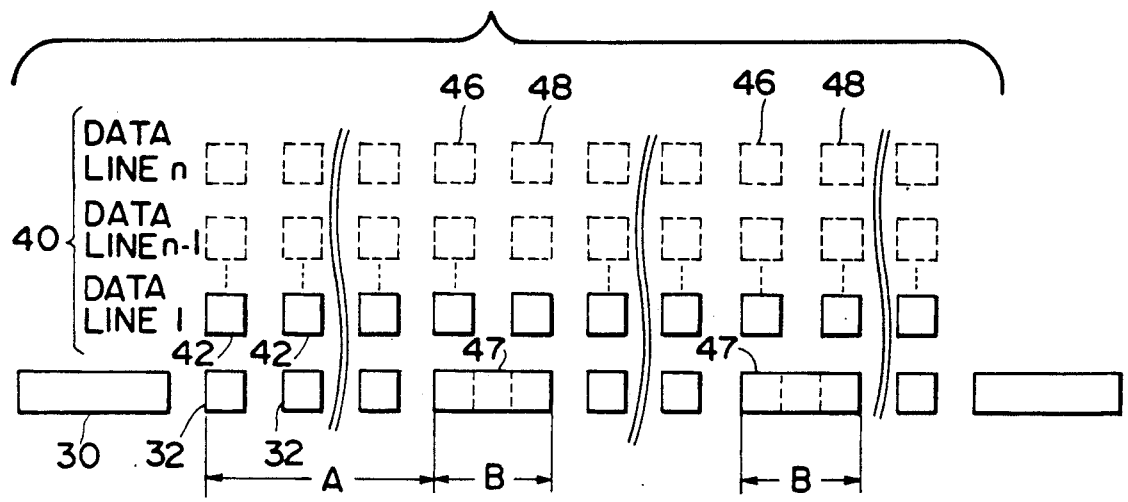
FIG. 1 is an explanatory view showing one form of an optical recording medium according to the present invention.

The optical memory card to which the present invention is applied comprises, as illustrated in FIG. 1, a clock track 30 and a data track section 40 including a plurality of data lines 1 to n which are arranged along the clock track 30. The clock track 30 is also used as a guide line for tracking in the present embodiment, but it may of course be provided separately from the guide line.

In the present specification, n bits formed of data lines 1 to n which are read at one time by one clock bit are defined as one word. The clock track 30 consists basically of regular clock bits 32 which are arranged in line at equal intervals. The clock track 30 further includes irregular clock bits 47 for leading words 46 of the respective data as described above. Each of the irregular clock bits 47 corresponds to the leading word 46 and it is formed to continuously extend in length to a succeeding clock bit. A word 48 may alternatively be used as a leading word. An interval A between the irregular clock bits is at least of a length of bits in which the PLL circuit can be maintained in a locked state.

Clock Reading Circuit

Figure 2:
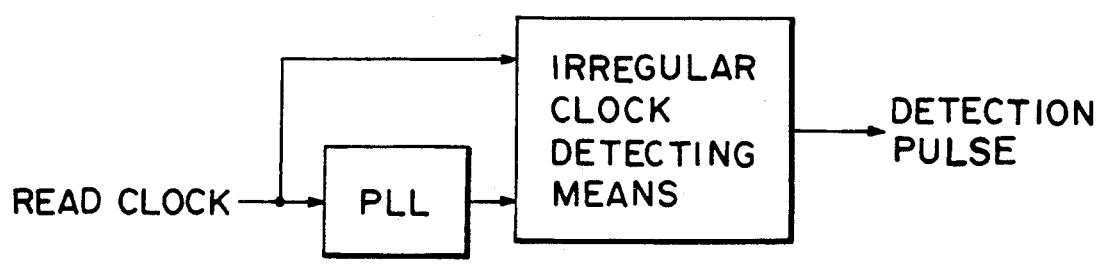
FIG. 2 is a block diagram showing a formation of a clock reading circuit for the optical recording medium according to the present invention.
Figure 3:
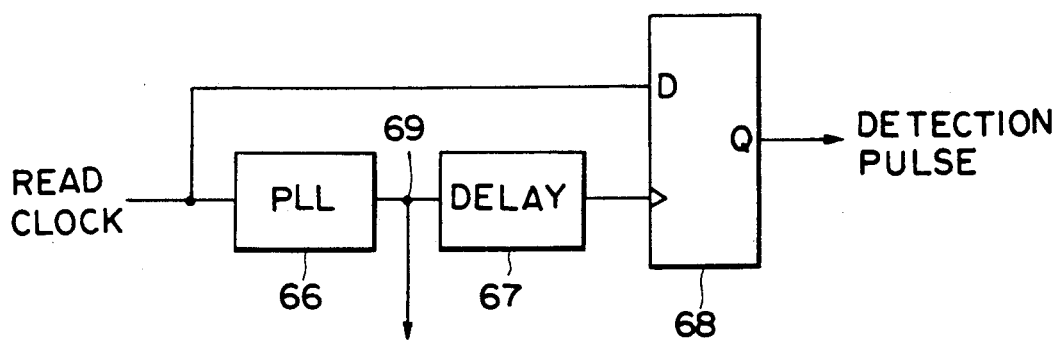
FIG. 3 is a block diagram of a specific arrangement of the clock reading circuit for the optical recording medium according to the present invention.

FIG. 3 is a block diagram of one form of a clock reading circuit embodying the present invention. In the circuit as illustrated, a delay element 67 and a D flip-flop (hereinafter referred to as "D F/F") 68 are used for an irregular clock detecting means of FIG. 2.

A PLL circuit 66 (N=1) receives a read clock signal which is a binary-coded signal changed from a read signal of the clock track 30. D F/F 68 receives the read clock at its D input terminal and it receives, at its clock input terminal, an output 66 from the PLL circuit 66 through the delay element 67 to generate a clock output at its Q output terminal.

In the case where a phase of the output 69 from the PLL circuit 66 is delayed by a predetermined time from a phase of the read clock, there is no need to provide the delay element 67.

Operation of Clock Reading Circuit

An operation of the circuit shown in FIG. 3 will now be described, referring to a timing diagram of FIG. 4.

Figure 4:
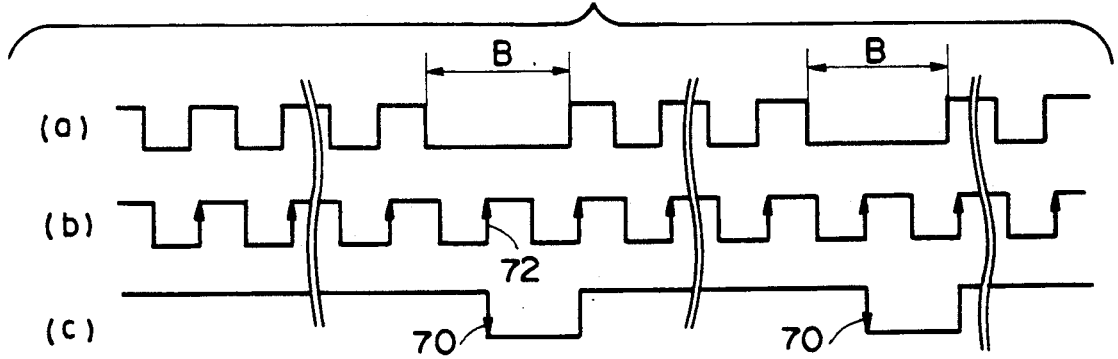
FIG. 4 is a timing waveform diagram showing signal waveforms at essential portions of the circuit shown in FIG. 3.
Figure 5:
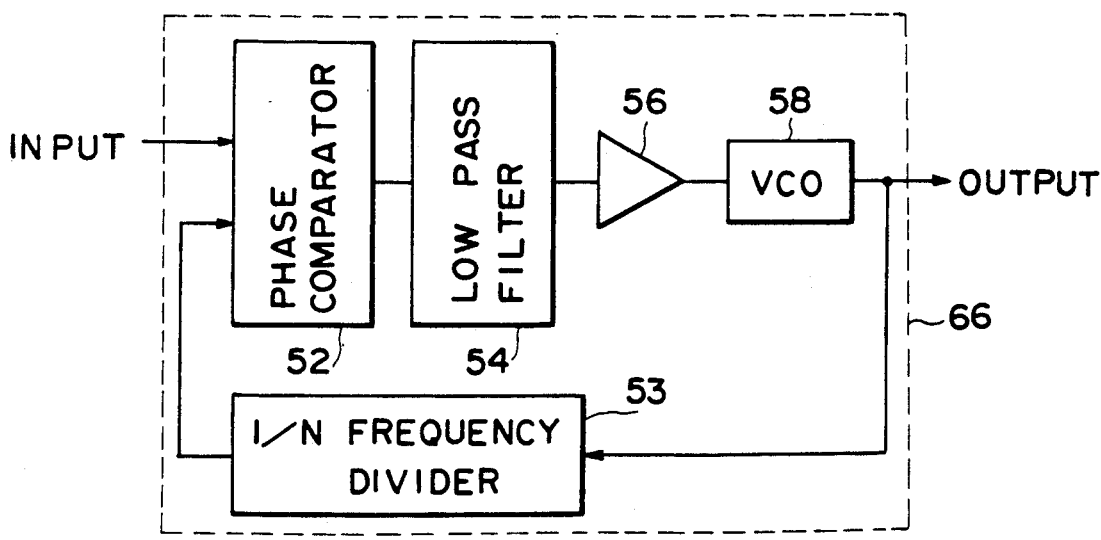
FIG. 5 is a diagram showing an arrangement of a conventional PLL circuit.

The read clock input to the PLL circuit 66 of FIG. 3 has a waveform as shown by (a) in FIG. 4 in which one clock, periodical one, is missing in a term B. The term B corresponds to the irregular clock bit 47 of FIG. 1. If the PLL circuit 66 is in a locked state, the output from the circuit 66 is a clock signal of a frequency conformed with a frequency of the input thereto. This clock signal is utilized as a clock signal for reading/writing of data.

On the other hand, the clock signal is delayed by the delay element 67 to be a delayed clock signal (shown by (b) in FIG. 4. D F/F 68 takes in the read clock (waveform (a)) by a leading edge of the delayed clock signal (waveform (b)). The delay time of the delay element 67 is so determined that "high" levels of the read clocks may be taken in, except when the irregular clock bit is being read. Therefore, the Q output (waveform (c)) of D F/F 68 is normally kept "high", while the waveform (b) rises and the Q output of D F/F 68 becomes "low" if the waveform (a) becomes "low" during reading of the irregular clock bit (the term B).

When the waveform (b) rises again thereafter, the waveform (a) is reinstated into the "high" state and therefore the Q output is also reinstated into the "high" state. Thus, a detection pulse 70 is output when the irregular clock bit is read. The leading word of the read data is identified in response to the detection pulse.

Other Embodiments

Figure 6:
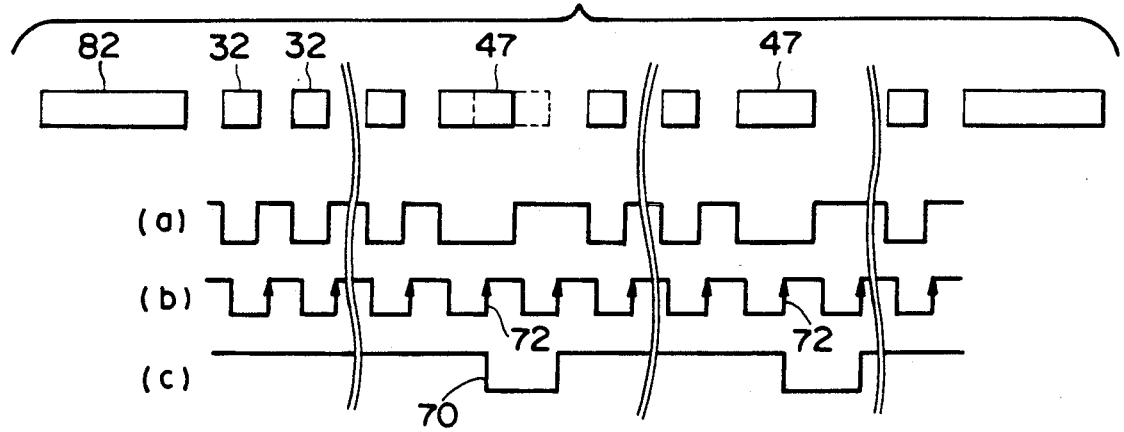
FIGS. 6 to 8 are explanatory views each showing a modification of the clock track according to the present invention and a signal waveform corresponding thereto, respectively.
Figure 7:
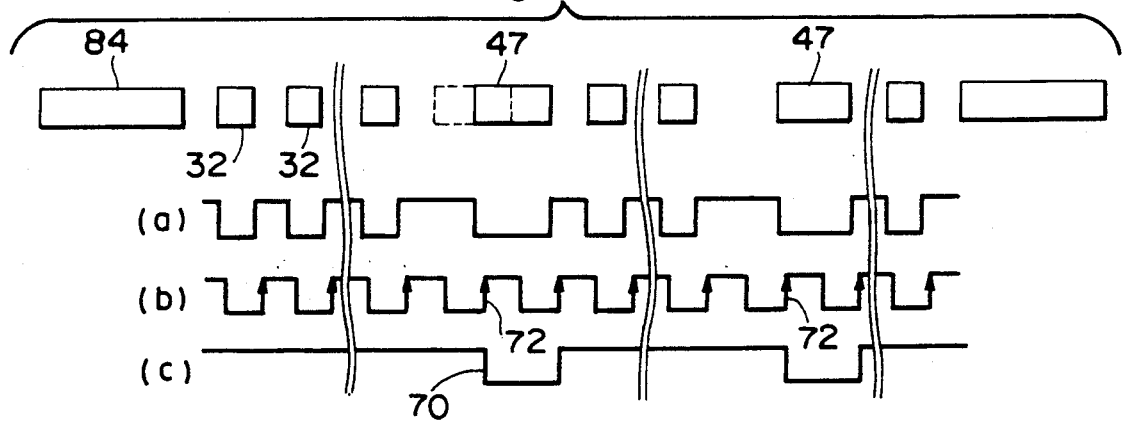
Figure 8:
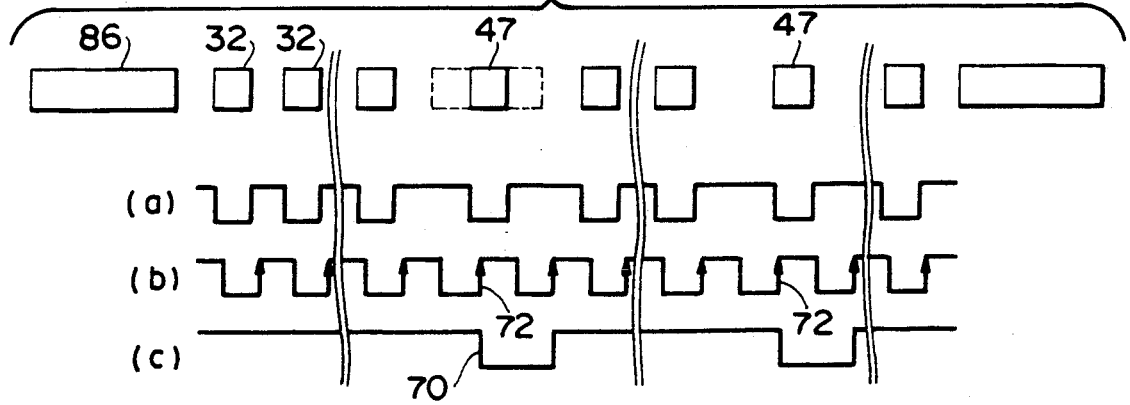

FIGS. 6 to 8 illustrate other forms of the clock track of the optical recording medium and waveforms of signals generated from clock reading circuits which correspond to said other forms of the clock track, respectively. Clock tracks 82, 84 and 86 of FIGS. 6 to 8 have irregular clock bits 47, respectively, which are different from that of FIG. 1. Waveforms (a) of the respective read clocks are also different from that of FIG. 1 accordingly.

A common feature of the irregular clock bits 47 of the respective clock tracks shown in FIGS. 1, 6 to 8 is that a clock bit is provided at a position where no clock bit is formed in a clock track comprised only of regular, periodical clock bits 32. In other words, an optically changed state identical with those of the clock bits 32 is formed at a space between two clock bits 32 according to necessity. Therefore, although the waveforms (a) are different between FIGS. 6 to 8, the resultant waveforms (c) are the same. More particularly, since the waveform of the read clock is at a "low" level at rising 72 of the output clock generated from the PLL circuit when the irregular bit is read, a detection pulse 70 is then generated.

The present invention is suitably applied to a system in which a read word is stored in a storage means when the PLL circuit is being kept locked, but the read word is not stored when the PLL circuit is out of lock.

While a few embodiments of the invention have been illustrated and described in detail, various changes and modifications may be introduced without departing from the scope of the present invention. For example, the "high" and "low" of the respective waveforms of FIG. 4 may be vice versa.

What is claimed is:

1. An optical recording medium having a surface provide with a clock track having a plurality of clock bits and a data track section having a plurality of data bits arranged in a line, and the clock bits and data bits being arranged in parallel on said surface so that a plurality of data tracks are read simultaneously by each of the clock bits, and said clock track including irregular clock bits for leading words, at least one leading word being intermediate said line.

2. An optical recording medium according to claim 1, in which said clock track is a guide line.

3. An optical recording medium according to claim 1, in which the clock track consists of regular clock bits between said irregular clock bits arranged in a line at equal intervals.

* * * * *